(12) United States Patent
Park

(10) Patent No.: US 12,339,209 B2
(45) Date of Patent: Jun. 24, 2025

(54) PARTICLES COUNTING DEVICE THAT CAN BE MAINTAINED BY REPLACEMENT

(71) Applicant: Jun Cheol Park, Gyeonggi-do (KR)

(72) Inventor: Jun Cheol Park, Gyeonggi-do (KR)

( * ) Notice: Subject to any disclaimer, the term of this patent is extended or adjusted under 35 U.S.C. 154(b) by 431 days.

(21) Appl. No.: 17/796,356

(22) PCT Filed: Jan. 18, 2021

(86) PCT No.: PCT/KR2021/000662
§ 371 (c)(1),
(2) Date: Jul. 29, 2022

(87) PCT Pub. No.: WO2021/225252
PCT Pub. Date: Nov. 11, 2021

(65) Prior Publication Data
US 2023/0065172 A1    Mar. 2, 2023

(30) Foreign Application Priority Data

May 7, 2020   (KR) ........................ 10-2020-0054303

(51) Int. Cl.
*G01N 15/02*       (2024.01)
*G01N 15/0205*    (2024.01)
(Continued)

(52) U.S. Cl.
CPC ......... *G01N 15/0211* (2013.01); *G01N 15/06* (2013.01); *G01N 15/1404* (2013.01);
(Continued)

(58) Field of Classification Search
CPC .............. G01N 15/0211; G01N 15/06; G01N 15/1404; G01N 15/1459; G01N 2015/0046; G01N 2015/1486
See application file for complete search history.

(56) References Cited

U.S. PATENT DOCUMENTS 5,459,569 A * 10/1995 Knollenberg .......... G01N 21/53
356/338
6,639,671 B1 * 10/2003 Liu .................... G01N 15/0205
356/336
(Continued)

FOREIGN PATENT DOCUMENTS

JP         2019-184317 A      10/2019
KR       101030329 B1 *    4/2011  ............. G01N 15/14
(Continued)

OTHER PUBLICATIONS

International Search Report for PCT/KR2021/000662 mailed on May 28, 2021.

*Primary Examiner* — Freddie Kirkland, III
(74) *Attorney, Agent, or Firm* — The PL Law Group, PLLC

(57) ABSTRACT

A particles counting device according to an embodiment includes a body module, and an attachable/detachable chamber module inserted into the body module in an attachable/detachable manner, wherein the attachable/detachable chamber module is provided to include a memory that stores a reference voltage value for each channel, and extract the reference voltage value for each channel from the memory for counting the number of particles according to a light scattering signal to transmit the reference voltage value to the body module, and the body module is provided to receive the light scattering signal and the reference voltage value for each channel from the attachable/detachable chamber module, and count the number of particles for each channel on the basis of the received light scattering signal and the reference voltage value for each channel.

9 Claims, 10 Drawing Sheets

(51) Int. Cl.
*G01N 15/06* (2006.01)
*G01N 15/14* (2006.01)
*G01N 15/1404* (2024.01)
*G01N 15/00* (2006.01)

(52) U.S. Cl.
CPC . *G01N 15/1459* (2013.01); *G01N 2015/0046* (2013.01); *G01N 2015/1486* (2013.01)

(56) References Cited

U.S. PATENT DOCUMENTS

| | | | | |
|---|---|---|---|---|
| 6,903,818 B2* | 6/2005 | Cerni | ................ | G01N 15/14 |
| | | | | 250/341.8 |
| 7,752,930 B2* | 7/2010 | Kreikebaum | ........ | G01N 1/2202 |
| | | | | 73/863.23 |
| 7,796,255 B2* | 9/2010 | Miller | ................ | G01N 15/0205 |
| | | | | 356/337 |
| 8,009,290 B2* | 8/2011 | Unger | ................ | G01N 15/0205 |
| | | | | 356/336 |
| 9,500,591 B1* | 11/2016 | Goad | ................ | G01N 21/6486 |
| 9,726,579 B2* | 8/2017 | Han | ................ | G01N 15/06 |
| 10,094,755 B1* | 10/2018 | Chandler | ................ | G01N 21/53 |
| 10,151,682 B2* | 12/2018 | Godoy | ................ | G01N 15/06 |
| 10,267,723 B1* | 4/2019 | Saaski | ................ | G01N 15/1404 |
| 10,557,472 B2* | 2/2020 | Neander | ................ | F04D 27/004 |
| 10,801,945 B2* | 10/2020 | Schuda | ................ | G01N 15/1459 |
| 11,054,357 B2* | 7/2021 | Ozcan | ................ | G01N 15/1434 |
| 11,215,546 B2* | 1/2022 | MacLaughlin | .... | G01N 15/0606 |
| 11,988,591 B2* | 5/2024 | Pariseau | ............ | G01N 15/1459 |
| 12,055,474 B2* | 8/2024 | Pariseau | ............ | G01N 15/1012 |
| 2017/0248509 A1* | 8/2017 | Godoy | ................ | G01N 21/53 |
| 2019/0086379 A1* | 3/2019 | Hur | ................ | H05K 5/03 |
| 2020/0011779 A1* | 1/2020 | Lavrovsky | ............ | G01N 15/06 |

FOREIGN PATENT DOCUMENTS

| | | |
|---|---|---|
| KR | 10-2016-0122350 A | 10/2016 |
| KR | 10-2017-0086248 A | 7/2017 |
| KR | 10-1960522 B1 | 3/2019 |

* cited by examiner

PARTICLES COUNTING DEVICE THAT CAN BE MAINTAINED BY REPLACEMENT

PRIORITY

This application claims benefit under 35 U.S.C. 119, 120, 121, or 365(c), and is a National Stage entry from International Application No. PCT/KR2021/000662, filed Jan. 18, 2021, which claims priority to the benefit of Korean Patent Application No. 10-2020-0054303 filed in the Korean Intellectual Property Office on May 7, 2020, the entire contents of which are incorporated herein by reference.

BACKGROUND

1. Technical Field

An embodiment of the present invention relates to a particles counting device.

2. Background Art

Generally, a clean room is a place where a semiconductor manufacturing process, etc. are performed, and can be classified into several classes according to a degree of cleanliness of the inside thereof. The degree of cleanliness is determined by the number of particles of a certain size that exist per unit area, and in order to maintain a certain level of the degree of cleanliness, the cause of contamination should be determined through precise measurements from time to time. Accordingly, in the clean room, a particle density in the clean room is measured using the particles counting device.

The particles counting device includes an optical chamber provided with a reflecting mirror, an air suction fan that introduces air inside the clean room into the optical chamber, and a laser diode that generates laser light to make laser light collide with dust particles introduced into the optical chamber. Here, a performance change of the laser diode and the reflecting mirror occurs and lifespans thereof are different depending on use time, use temperature, use-degree-of-cleanliness, etc. which are a use environment of a consumer, and thus the performance of the particles counting device is deteriorated.

That is, as the use time increases, an amount of light of the laser diode decreases, and as the use temperature increases, the performance of the laser diode deteriorates and the lifespan thereof decreases. In addition, as the use time of the reflecting mirror increases, foreign substances are caught on a surface of the reflecting mirror, which results in deterioration of performance.

These parts should be calibrated by a certification authority on a yearly basis, and if a problem such as a failure occurs in these parts, a manufacturer's standard calibration should be performed after repair or replacement. The conventional particles counting device is assembled in one piece, and in the conventional particles counting device, calibration takes 1 to 2 weeks, and repair and calibration takes 2 to 3 weeks at the shortest and 4 to 8 weeks at the longest. Accordingly, there is a problem in that even if a failure occurs in a single part, a time gap during which the particles counting device cannot be used occurs from the point of view of the consumer, and costs for repair and calibration is incurred.

SUMMARY

An embodiment of the present invention is to provide a particles counting device that is easy to replace and repair.

A particles counting device according to a disclosed embodiment includes a body module and an attachable/detachable chamber module inserted into the body module in an attachable/detachable manner, in which the attachable/detachable chamber module is provided to include a memory that stores a reference voltage value for each channel, and extract the reference voltage value for each channel from the memory for counting the number of particles according to a light scattering signal to transmit the reference voltage value to the body module, and the body module is provided to receive the light scattering signal and the reference voltage value for each channel from the attachable/detachable chamber module, and count the number of particles for each channel on the basis of the received light scattering signal and the reference voltage value for each channel.

The body module may acquire use-related information including one or more of use time, use temperature, and use-degree-of-cleanliness of the particles counting device, and the body module may further include a display that displays the use-related information on a screen.

The body module may count the use time of the particles counting device and count accumulated use time of the particles counting device when the particles counting device is operated, measure the use temperature of the particles counting device through a temperature sensor, and measure the use-degree-of-cleanliness on the basis of the counted number of particles for each channel.

The body module may be provided to generate a maintenance alarm by comparing the acquired use-related information with preset threshold use information.

The body module may transmit the acquired use-related information to the attachable/detachable chamber module to be stored in the memory.

The attachable/detachable chamber module may include a first housing portion, an optical chamber provided in the first housing portion so as to provide a sealed space, a particle counting unit provided in the first housing portion so as to generate light into the optical chamber, to collect light scattered by particles included in air introduced into the optical chamber, and to generate a light scattering signal, a substrate provided inside the first housing portion and electrically connected to the particle counting unit, and on which the memory is mounted, and a first connector provided on one side of the substrate so as to protrude toward the outside of the first housing portion. The body module may include a second housing portion, one side of which is open, the second housing portion having a containing space in which the attachable/detachable chamber module is contained, a main board provided in the second housing portion, and a second connector provided on one side of the main board such that, if the attachable/detachable chamber module is contained in the second housing portion, the second connector is connected to the first connector. The attachable/detachable chamber module may transmit the light scattering signal and the reference voltage value for each channel to the main board through the first connector and the second connector.

The body module may further include a first containing space in which the attachable/detachable chamber module is contained at one side inside of the second housing portion, a second containing space in which the main board is contained on the other side inside of the second housing portion, a partition wall provided between the first containing space and the second containing space inside the second housing portion and partitioning the first containing space and the second containing space, and a connector coupling groove formed in the partition wall. The attachable/detachable chamber module may be inserted into the first containing space from one side of the second housing portion and contained, and the first connector may be connected to the second connector through the connector coupling groove.

The particles counting device may further include an air inlet pipe for introducing air into the optical chamber, a first inlet pipe insertion hole provided in the first housing portion, and a second inlet pipe insertion hole provided in the second housing portion, and the air inlet pipe may be inserted into the second inlet pipe insertion hole and the first inlet pipe insertion hole to communicate with the optical chamber when the attachable/detachable chamber module is contained in the first receiving space.

A containing space, in which the attachable/detachable chamber module is inserted from an upper part to a lower part and contained, may be provided on one side inside of the body module, the substrate may be mounted on a lower end part of the first housing portion, the first connector may be provided to protrude from the lower end of the first housing portion to the outside, the main board may be mounted on a bottom surface of the second housing portion, and the second may be provided at a position corresponding to the first connector on the main board.

According to the disclosed embodiment, by allowing the attachable/detachable chamber module to be contained in the body module in an attachable/detachable manner and storing the reference voltage value for each channel and use-related information of the particles counting device in the memory of the attachable/detachable chamber module, the attachable/detachable chamber module with parts which require periodic calibration and of which performance changes depending on the use environment can be easily replaced. Since only the attachable/detachable chamber module needs to be replaced, a time gap due to the replacement does not occur.

In addition, since the reference voltage value for each channel is stored in the memory of the attachable/detachable chamber module to be replaced, the reference voltage value of each channel can also be easily corrected when replacing or repairing parts of the attachable/detachable chamber module.

In addition, by displaying the use-related information of the particles counting device on the screen and generating a maintenance alarm by comparing the use-related information with preset threshold use information, a self-diagnosis function of the particles counting device can be implemented, the convenience of maintenance can be increased, and the costs for maintenance can be reduced.

DETAILED DESCRIPTION

Figure 1:
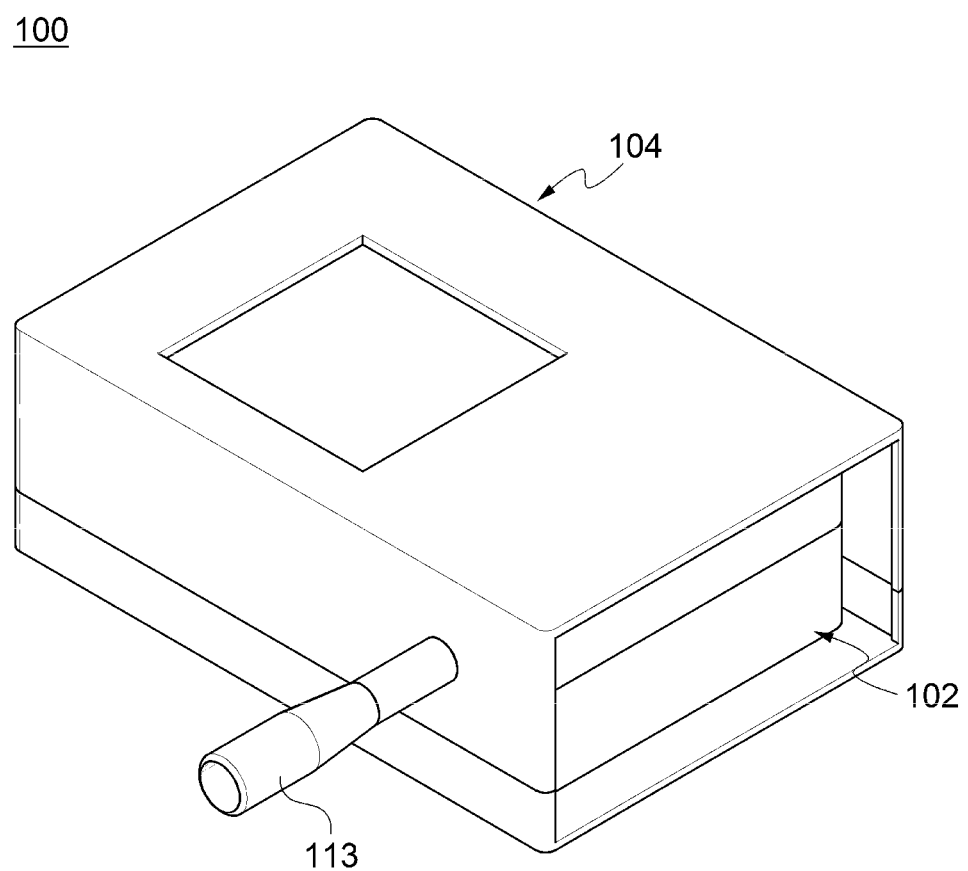
FIG. 1 is a perspective view illustrating a particles counting device according to an embodiment of the present invention.

Hereinafter, a specific embodiment of the present invention will be described with reference to the drawings. The following detailed description is provided to aid in a comprehensive understanding of the methods, apparatus and/or systems described herein. However, this is illustrative only, and the present invention is not limited thereto.

In describing the embodiments of the present invention, when it is determined that a detailed description of known technologies related to the present invention may unnecessarily obscure the gist of the present invention, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments of the present invention, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, terms "transfer", "communication", "transmission", "reception", and other similar meanings of a signal or information refer to not only direct transmission of the signal or information from one component to another, but also transmission of the signal or information through another component. In particular, to "transfer" or "transmit" a signal or information to a component indicates that the signal or information is "transferred" or "transmitted" to a final destination of the signal or information, and does not imply that the signal or information is "transferred" or "transmitted" to a direct destination. The same is true for "reception" of a signal or information. In addition, in this specification, when two or more pieces of data or information are "related", it means that when one piece of data (or information) is acquired, at least a part of the other pieces of data (or information) can be acquired on the basis thereof.

Meanwhile, directional terms such as top, bottom, one side, the other side, etc. are used in connection with the orientation of the disclosed figures. Since components of embodiments of the present invention may be positioned in various orientations, the directional terms are used for purposes of illustration and does not limit it.

In addition, terms such as a first and a second may be used to describe various components, but the components should not be limited by the terms. The above terms may be used for the purpose of distinguishing one component from another component. For example, without departing from the scope of right of the present disclosure, a first component may be referred to as a second component, and similarly, the second component may also be referred to as the first component.

Figure 2:
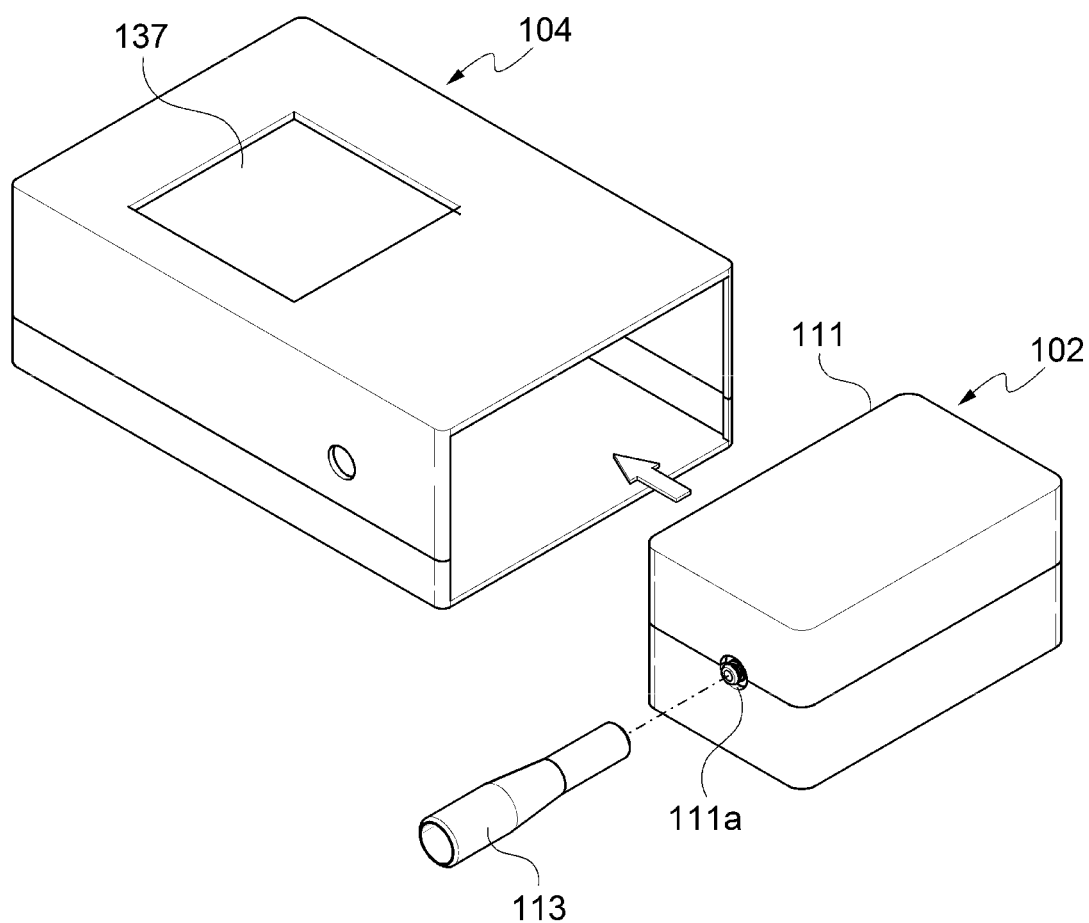
FIG. 2 is an exploded perspective view of the particles counting device according to the embodiment of the present invention.
Figure 3:
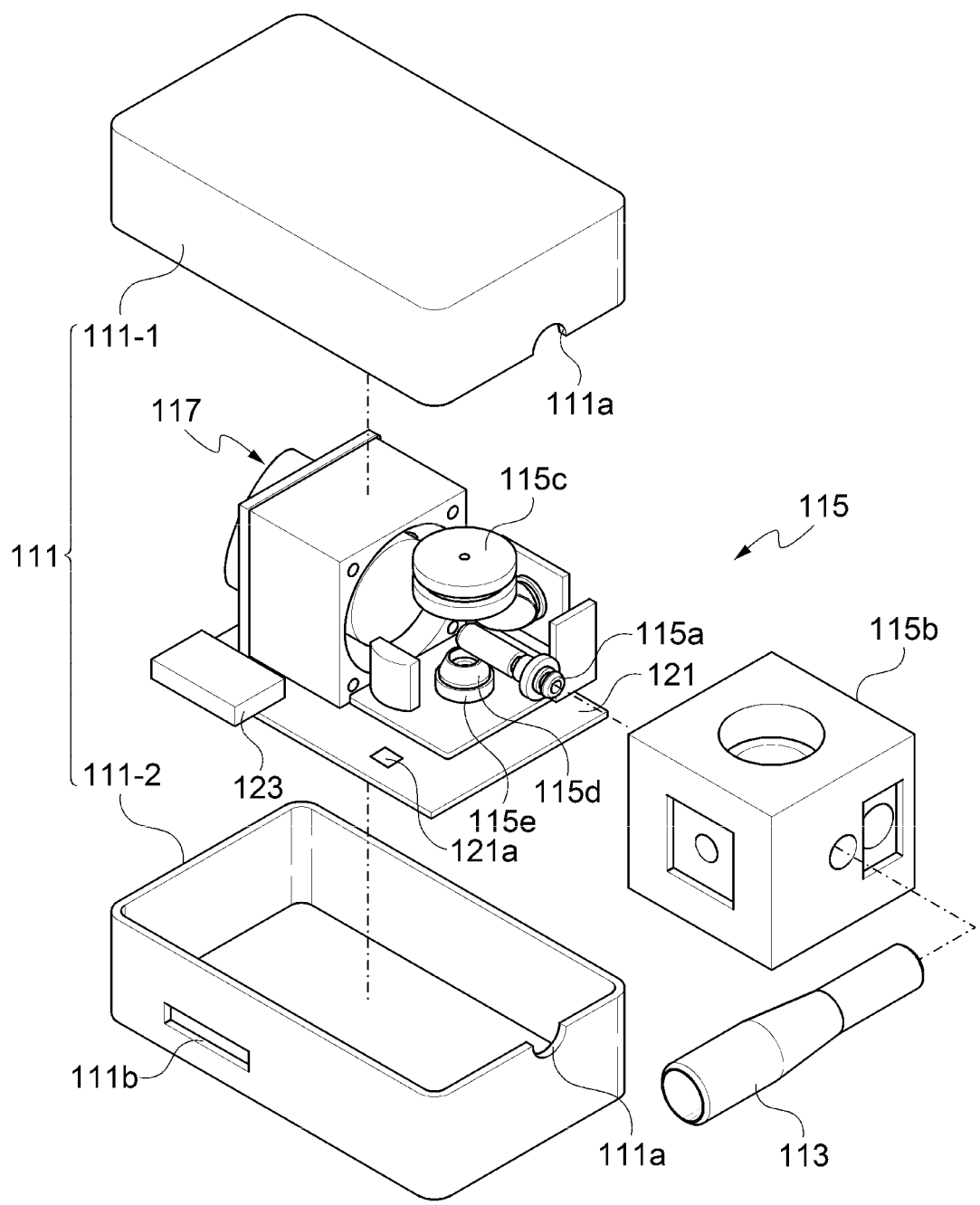
FIG. 3 is an exploded perspective view of an attachable/detachable chamber module according to an embodiment of the present invention.
Figure 4:
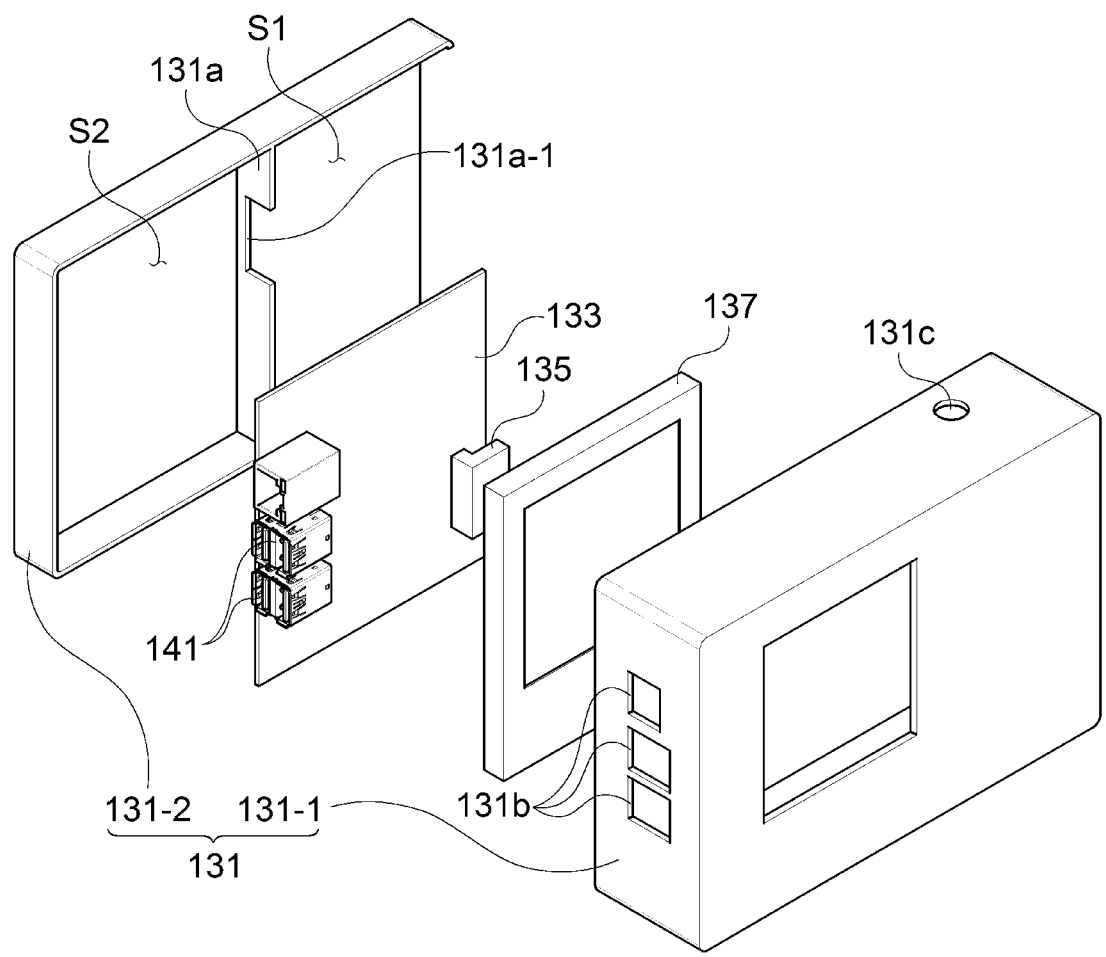
FIG. 4 is an exploded perspective view of a body module according to an embodiment of the present invention.

FIG. 1 is a perspective view illustrating a particles counting device according to an embodiment of the present invention, FIG. 2 is an exploded perspective view of the particles counting device according to the embodiment of the present invention, FIG. 3 is an exploded perspective view of an attachable/detachable chamber module according to an embodiment of the present invention, and FIG. 4 is an exploded perspective view of a body module according to an embodiment of the present invention.

Referring to FIGS. 1 to 4, a particles counting device 100 may include an attachable/detachable chamber module 102 and a body module 104. In an exemplary embodiment, the particles counting device 100 may be used to measure the number of particles in a clean room, but is not limited thereto, and may measure the number of particles in various other indoor and outdoor places.

The attachable/detachable chamber module 102 may be contained inside the body module 104 in an attachable/detachable manner. That is, the attachable/detachable chamber module 102 may be configured separately from the body module 104, may be contained in the body module 104 in an attachable/detachable manner, and may be electrically connected to the body module 104. In an exemplary embodiment, the attachable/detachable chamber module 102 may be contained inside the body module 104 from one side of the body module 104, but a structure in which the attachable/detachable chamber module 102 is contained in the body module 104 in an attachable/detachable manner is not limited thereto.

The attachable/detachable chamber module 102 may make external air to be introduced into the interior, generate light onto particles included in the introduced air to make light collide with the particles, and may generate an electrical signal (light scattering signal) by collecting light generated when light collides with the particles. The attachable/detachable chamber module 102 may transmit the light scattering signal to the body module 104.

In addition, the attachable/detachable chamber module 102 may receive use-related information of the particles counting device 100 from the body module 104. Here, the use-related information may include one or more of the use time (including accumulated use time), the use temperature, and the use-degree-of-cleanliness of the attachable/detachable chamber module 102. That is, the attachable/detachable chamber module 102 may receive the use-related information about how long the particles counting device 100 has been used, at which temperature the particles counting device was used, and what air cleanliness (may be determined by the number of particles) is in the use environment, etc. from the body module 104.

The attachable/detachable chamber module 102 may include a first housing portion 111, an air inlet pipe 113, a particle counting unit 115, an air suction means 117, a substrate 121, and a first connector 123.

The first housing portion 111 may constitute an appearance of the attachable/detachable chamber module 102. In an exemplary embodiment, the first housing portion 111 may have a hexahedral shape, but the shape thereof is not limited thereto. The first housing portion 111 may include a 1-1 housing portion 111-1 and a 1-2 housing portion 111-2. The 1-1 housing portion 111-1 may be an upper housing, and the 1-2 housing portion 111-2 may be a lower housing. The 1-1 housing portion 111-1 and the 1-2 housing portion 111-2 may be provided to be coupled to each other or may be provided integrally. A first inlet pipe insertion hole 111a may be provided in the first housing portion 111.

The air inlet pipe 113 may be coupled to the first housing portion 111. In an exemplary embodiment, the air inlet pipe 113 may be inserted into the first inlet pipe insertion hole 111a to be coupled to the first housing portion 111. In this case, the air inlet pipe 113 may communicate with the optical chamber 115b of the particle counting unit 115. The air inlet pipe 113 may serve as a passage for introducing external air into the first housing portion 111.

The particle counting unit 115 may generate a light scattering signal for counting particles included in the introduced air in the optical chamber 115b. In an exemplary embodiment, the particle counting unit 115 may include a light generator 115a for generating light into the optical chamber 115b (e.g., the light generator includes a laser diode, etc.), a reflecting mirror 115c for collecting the light scattering generated when the generated light collides with the particles, a photodiode 115d for receiving the collected light scattering and converting scattered light into an electrical signal (light scattering signal), and a signal amplifier 115e for amplifying the light scattering signal, etc.

The optical chamber 115b may contain the components of the particle counting unit 115 therein. An end portion of the air inlet pipe 113 may be coupled to the optical chamber 115b. The optical chamber 115b may provide a sealed space in which the particle counting unit 115 counts particles included in the air introduced through the air inlet pipe 113.

That is, the particle counting unit 115 includes the components (e.g., light generator, reflecting mirror, etc.) whose performance changes according to the use environment (the use time, use temperature, use-degree-of-cleanliness, etc.). The components included in the particle counting unit 115 are already known techniques, and thus a detailed description thereof will be omitted.

The air suction means 117 may serve to introduce external air into the optical chamber 115b through the air inlet pipe 113. In an exemplary embodiment, the air suction means 117 may include a vacuum pump, a suction fan, etc. to introduce external air.

The substrate 121 may be provided in the first housing portion 111. Circuits for driving and controlling each component of the attachable/detachable chamber module 102 may be provided on the substrate 121. In an exemplary embodiment, the substrate 121 may be electrically connected to the particle counting unit 115 and the air suction means 117.

Meanwhile, a memory 121a that stores a reference voltage value for each channel for counting particles and use-related information may be mounted on the substrate 121. The attachable/detachable chamber module 102 may receive the use-related information of the particles counting device 100 and record the use-related information in the memory 121a. The attachable/detachable chamber module 102 may extract the reference voltage value for each channel from the memory 121a and transmit the the reference voltage value to the body module 104.

The first connector 123 may be provided on one side of the substrate 121. The first connector 123 may be electrically connected to the substrate 121. The first connector 123 may be provided to protrude from one side of the first housing portion 111. To this end, a connector exposure hole 111b may be provided on one side surface of the first housing portion 111. The first connector 123 may be inserted into the connector exposure hole 111b and protrude to the outside. The attachable/detachable chamber module 102 may transmit and receive the light scattering signal, the reference voltage value for each channel, and the use-related information to and from the body module 104 through the first connector 123.

The body module 104 may detect a particle size and the number of particles in the optical chamber 115b on the basis of the light scattering signal received from the attachable/detachable chamber module 102. The body module 104 may display particle detection information including one or more of the detected particle size and the number of particles on the screen. In addition, the body module 104 may display the use-related information received from the attachable/detachable chamber module 102 on the screen. The body module 104 may include a second housing portion 131, a main board 133, a second connector 135, and a display 137.

The second housing portion 131 may constitute the appearance of the body module 104. In an exemplary embodiment, the second housing portion 131 may have a hexahedral shape, but the shape thereof is not limited thereto. The second housing portion 131 may include a 2-1 housing portion 131-1 and a 2-2 housing portion 131-2. The 2-1 housing portion 131-1 may be an upper housing, and the 2-2 housing portion 131-2 may be a lower housing. The 2-1 housing portion 131-1 and the 2-2 housing portion 131-2 may be provided to be coupled to each other or may be provided integrally.

A first containing space S1 in which the attachable/detachable chamber module 102 is contained may be provided on one side inside of the second housing portion. The second housing portion 131 may be provided with one side open, and the attachable/detachable chamber module 102 may be contained by being inserted into the open side surface.

In addition, a second inlet pipe insertion hole 131c may be provided in the second housing portion 131. In this case, after the attachable/detachable chamber module 102 is inserted into the first receiving space S1 and contained, the air inlet pipe 113 may be inserted through the second inlet pipe insertion hole 131c and the first inlet pipe insertion hole 111a and coupled.

A second containing space S2 in which the body module 104 is contained may be provided on the other side inside of the second housing portion 131. A partition wall 131a may be provided inside the second housing portion 131, and the first containing space S1 and the second containing space S2 may be divided through the partition wall 131a. The partition wall 131a may be provided along a width direction of the second housing portion 131 inside the second housing portion 131. A connector coupling groove 131a-1 may be provided on the partition wall 131a.

The main board 133 may be contained in the second containing space S2 of the second housing portion 131. The main board 133 may be provided to receive the light scattering signal and the reference voltage value for each channel from the attachable/detachable chamber module 102 to count the number of particles for each channel.

Table 1 is a table illustrating the channel classification according to the particle size and the reference voltage value for each channel.

TABLE 1

| channel | CH1 | CH2 | CH3 | CH4 | CH5 | CH6 |
|---|---|---|---|---|---|---|
| particle size | 0.3 μm | 0.5 μm | 1 μm | 5 μm | 10 μm | 20 μm |
| reference voltage | 0.05 V | 0.2 V | 2.3 V | 0.08 V | 0.6 V | 1.2 V |

Figure 5:
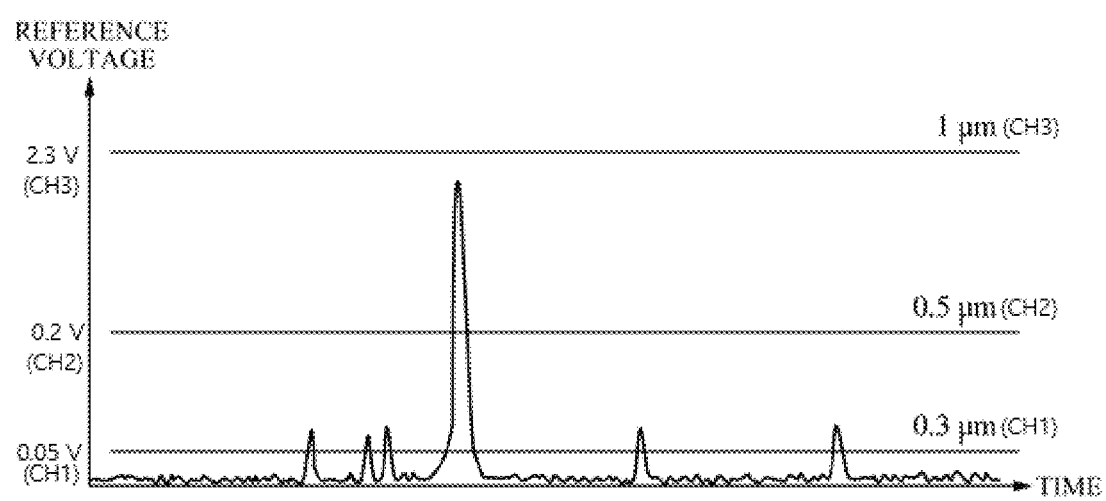
FIG. 5 is a view illustrating a state in which the number of particles is counted by comparing a light scattering signal and a reference voltage value of each channel according to an embodiment of the present invention.

The main board 133 may compare the light scattering signal with the reference voltage value of each channel and count the number of particles having a corresponding size or larger for each channel. FIG. 5 is a view illustrating a state in which the number of particles is counted by comparing the light scattering signal and the reference voltage value of each channel according to an embodiment of the present invention.

Referring to FIG. 5, it can be seen that in the case of channel 1 CH1, the number of particles of 0.3 μm or more is 6, and in the case of channel 2 CH2, the number of particles of 0.5 μm or more is 1, and in the case of channel 3 CH3, the number of particles of 1 μm or more is 0.

Here, since the reference voltage value of each channel should be updated according to the state or degree of aging of the particle counting unit 115 in the attachable/detachable chamber module 102, the reference voltage value of each channel is stored in the memory of the substrate 121 contained in the attachable/detachable chamber module 102, so that the reference voltage value of each channel can also be easily corrected when replacing or repairing parts of the attachable/detachable chamber module 102.

In addition, the main board 133 may obtain use-related information of the particles counting device 100. The main board 133 may count the use time of the particles counting device 100 when the particles counting device 100 is operated. The main board 133 may count the accumulated use time of the particles counting device 100. The main board 133 may measure the use temperature of the particles counting device 100 through a temperature sensor, etc. The main board 133 may measure the use-degree-of-cleanliness based on the number of particles for each channel.

The main board 133 may display the acquired use-related information on the screen of the display 137. The main board 133 may transmit the acquired use-related information to the attachable/detachable chamber module 102 to be stored in the memory 121a of the substrate 121. The main board 133 may generate a maintenance alarm by comparing the acquired use-related information with preset threshold use information.

The main board 133 may generate the maintenance alarm when the acquired use time exceeds a preset threshold use time. The main board 133 may generate the maintenance alarm when the acquired use temperature exceeds a preset threshold use temperature, or when the accumulated use time at the acquired use temperature exceeds a preset threshold temperature use time. The main board 133 may generate the maintenance alarm when the acquired use-degree-of-cleanliness is less than a preset critical use-degree-of-cleanliness, or when the accumulated use time at the acquired cleanliness exceeds a preset threshold cleanliness use time.

As such, the particles counting device 100 displays the use-related information on the screen and generates the maintenance alarm by comparing the use-related information with preset threshold use information, thereby capable of implementing a self-diagnosis function of the particles counting device 100, increasing the convenience of maintenance, and reducing the cost of maintenance.

In addition, by storing the use-related information of the particles counting device 100 in the memory 121*a* of the attachable/detachable chamber module 102, the use-related information stored in the memory 121*a* can be referred to when parts of the attachable/detachable chamber module 102 are replaced or repaired, and maintenance and calibration are performed accordingly.

In an exemplary embodiment, the main board 133 may have a form in which a plurality of substrates are connected, but is not limited thereto. One or more interfaces 141 for connection with an external device may be provided on the main board 133. In addition, interface exposure holes 131*b* for exposing the interfaces 141 to the outside may be provided in the second housing portion 131.

The second connector 135 may be provided on one side of the main board 133. The second connector 135 may be electrically connected to the main board 133. The second connector 135 may be connected to the first connector 123 in the second housing portion 131. That is, when the attachable/detachable chamber module 102 is inserted into the first containing space S1 and contained, the first connector 123 and the second connector 135 can be coupled through the connector coupling groove 131*a*-1.

The display 137 may display the use-related information of the particles counting device 100 under the control of the main board 133. The display 137 may be provided to display a screen on a partial surface of the second housing portion 131.

Figure 6:
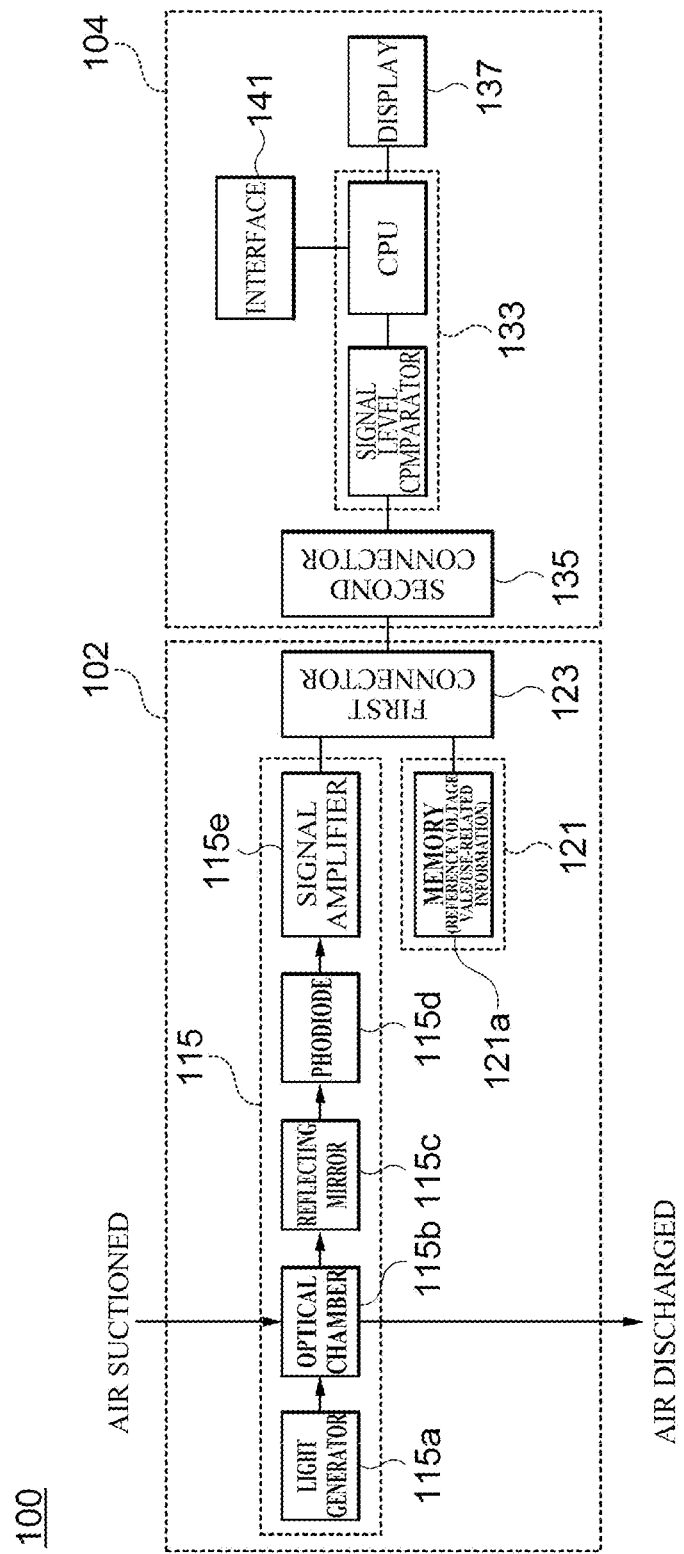
FIG. 6 is a block diagram schematically illustrating a configuration of the particles counting device according to the embodiment of the present invention.

FIG. 6 is a block diagram schematically illustrating a configuration of the particles counting device according to the embodiment of the present invention.

Referring to FIG. 6, the particles counting device 100 may include the body module 104 and the attachable/detachable chamber module 102 contained in the second housing portion 131 of the body module 104 in an attachable/detachable manner.

When air is sucked through the air suction means 117 in the attachable/detachable chamber module 102, external air is introduced into the optical chamber 115*b* through the air inlet pipe 113. Here, when the light generator 115*a* generates light into the optical chamber 115*b*, the light collides with particles in the optical chamber 115*b* and is scattered, and the scattered light 115*c* is collected. Then, the photodiode 115*d* receives the scattered light and converts the scattered light into an electrical signal (i.e., light scattering signal), and the signal amplifier 115*e* amplifies the light scattering signal.

The amplified light scattering signal is transmitted to the main board 133 through the first connector 123 and the second connector 135. In this case, the attachable/detachable chamber module 102 may extract a reference voltage value for each channel from the memory 121*a* and transmit the reference voltage value to the main board 133.

The main board 133 may include a signal level comparator and a central processing unit (CPU). The main board 133 may count the number of particles for each channel on the basis of the light scattering signal and the reference voltage value for each channel received from the attachable/detachable chamber module 102. The main board 133 may acquire use-related information and display the acquired use-related information on the screen of the display 137. In addition, the main board 133 may transmit the use-related information to the attachable/detachable chamber module 102 through the second connector 135 and the first connector 123 to be stored in the memory 121*a*.

According to the disclosed embodiment, by allowing the attachable/detachable chamber module 102 to be contained inside the main module in an attachable/detachable manner and storing the reference voltage value for each channel and the use-related information e of the particles counting device 100 in the memory 121*a* of the attachable/detachable chamber module 102, the attachable/detachable chamber module 102 with parts which require periodic calibration and of which performance changes depending on the use environment can be easily replaced. Since only the attachable/detachable chamber module 102 needs to be replaced, a time gap due to the replacement does not occur.

In addition, since the reference voltage value for each channel is stored in the memory 121*a* of the attachable/detachable chamber module 102 to be replaced, the reference voltage value of each channel can be easily corrected when replacing or repairing parts of the attachable/detachable chamber module 102.

In addition, by displaying the use-related information of the particles counting device 100 on the screen and generating the maintenance alarm by comparing the the use-related information with preset threshold use information, the self-diagnosis function of the particle counting device 100 can be implemented, the convenience of maintenance can be increased, and the cost of maintenance can be reduced.

Figure 7:
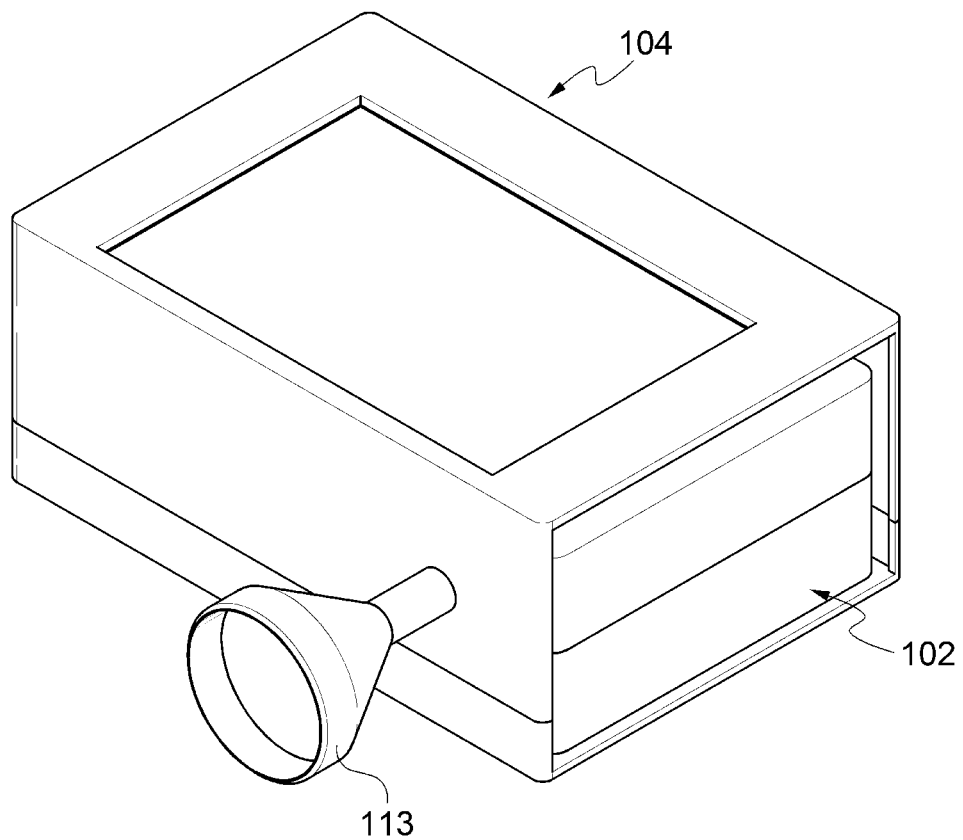
FIG. 7 is a perspective view illustrating a particles counting device according to another embodiment of the present invention.
Figure 8:
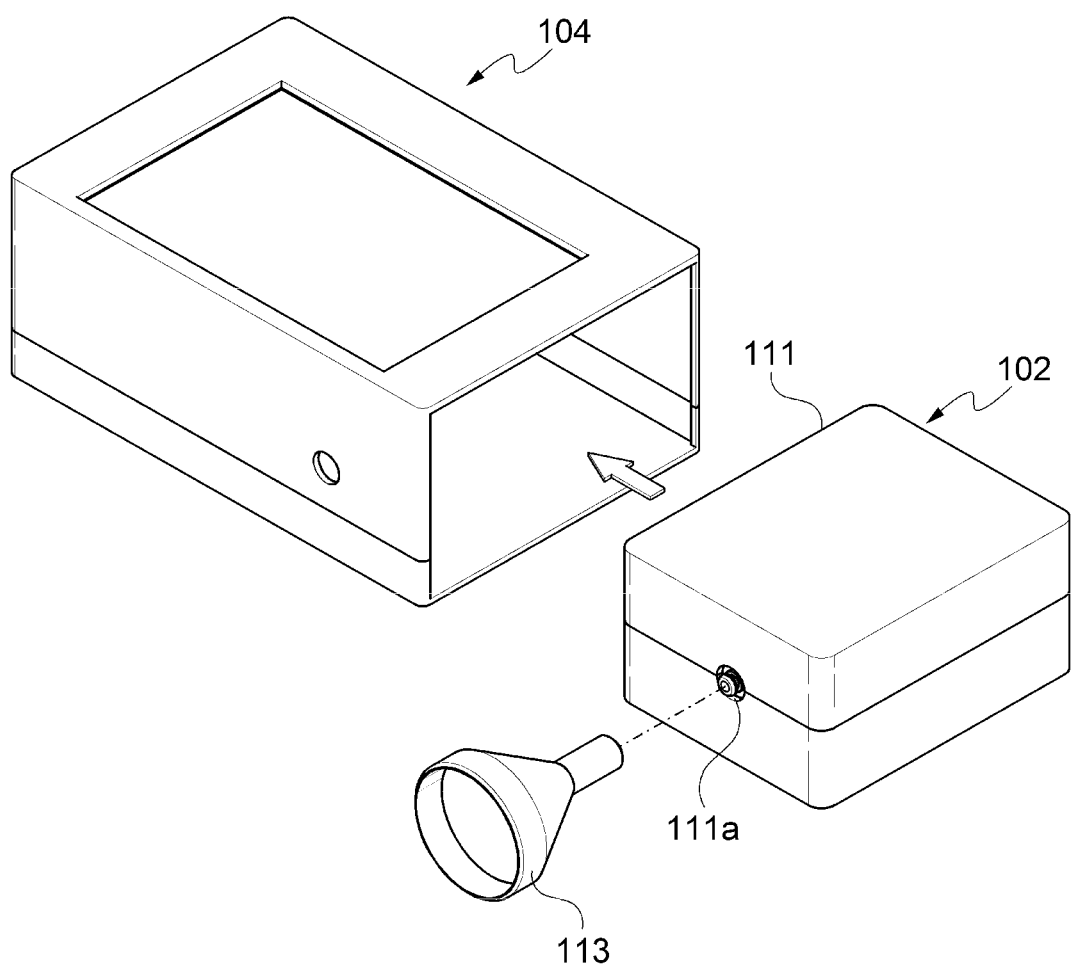
FIG. 8 is an exploded perspective view of a particles counting device according to an embodiment of the present invention.

FIG. 7 is a perspective view illustrating a particles counting device according to another embodiment of the present invention, and FIG. 8 is an exploded perspective view of the particles counting device according to an embodiment of the present invention. Here, a portion different from the embodiment illustrated in FIGS. 1 to 4 will be mainly described.

Referring to FIGS. 7 and 8, the attachable/detachable chamber module 102 may be contained by being inserted into an open side of the body module 104. In this case, the attachable/detachable chamber module 102 may be coupled to a funnel-shaped air inlet pipe 113. In addition, a handle portion (not illustrated) may be provided in the first housing portion 111 of the attachable/detachable chamber module 102 to easily insert and withdraw the attachable/detachable chamber module 102.

Figure 9:
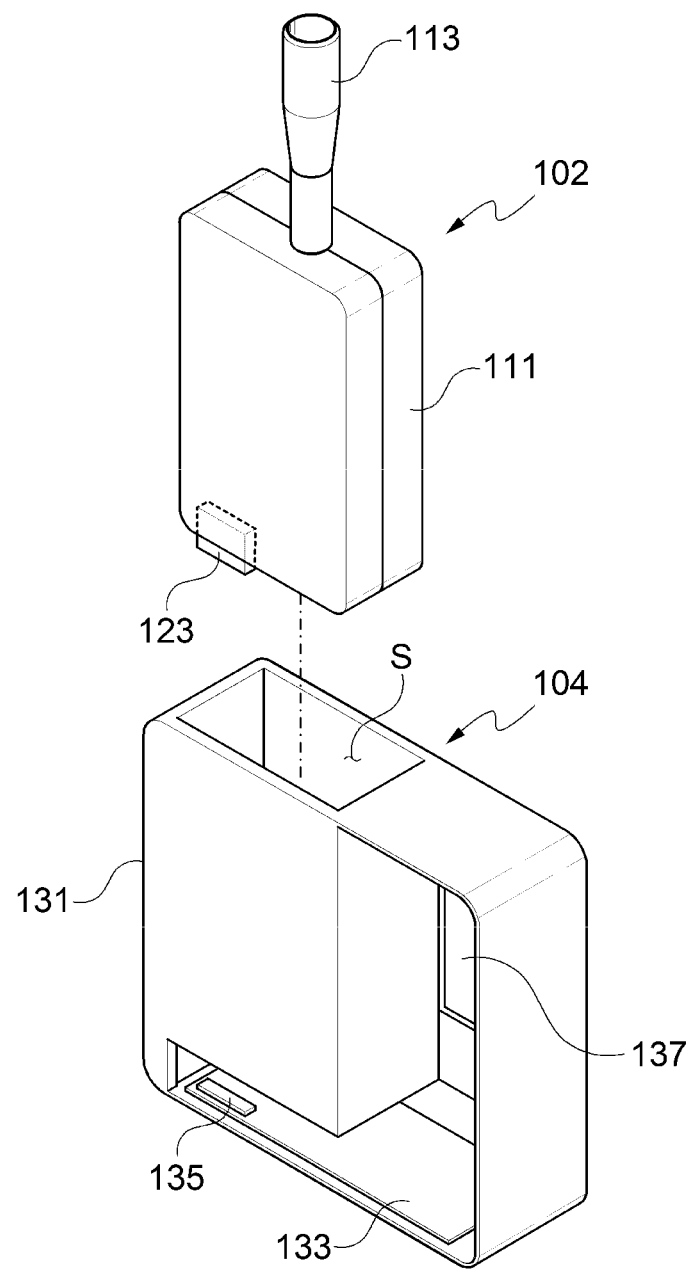
FIG. 9 is a perspective view illustrating a particles counting device according to another embodiment of the present invention.
Figure 10:
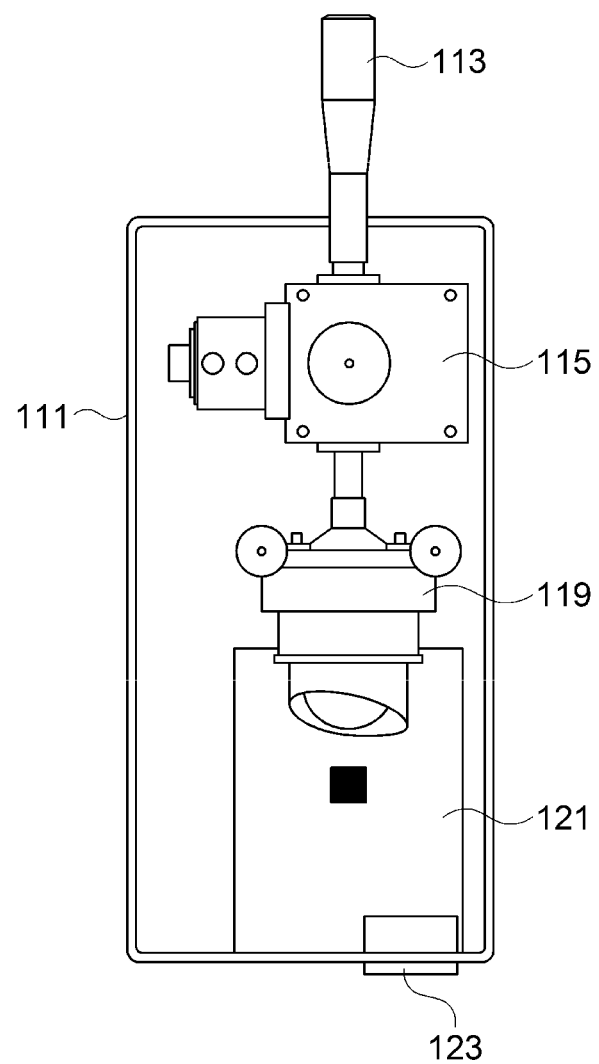
FIG. 10 is a view illustrating the inside of an attachable/detachable chamber module in a particles counting device according to still another embodiment of the present invention.

FIG. 9 is a perspective view illustrating a particles counting device according to still another embodiment of the present invention, and FIG. 10 is a view illustrating the inside of an attachable/detachable chamber module in a particles counting device according to still another embodiment of the present invention. Here, a portion different from the embodiment illustrated in FIGS. 1 to 4 will be mainly described.

Referring to FIGS. 9 and 10, the attachable/detachable chamber module 102 may be inserted into the body module 104 from an upper part of the body module 104 in an attachable/detachable manner. The substrate 121 of the attachable/detachable chamber module 102 may be mounted on a lower end part of the first housing portion 111, and the first connector 123 may be provided to protrude from the lower end of the first housing portion 111.

A containing space S in which the attachable/detachable chamber module 102 is contained is provided on one side inside of the second housing portion 131 of the body module 104, and an upper part of the storage space S may be provided to be open. The main board 133 may be provided at a lower end of the second housing portion 131. In an exemplary embodiment, the main board 133 may be mounted on the bottom surface of the second housing portion 131. The second connector 135 may may be provided to protrude from the main board 133. When the attachable/detachable chamber module 102 is inserted into the containing space S, the first connector 123 may be coupled to the second connector 135.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A particles counting device comprising:
  a body module comprising:
    a second housing portion having an opening in one side of the second housing portion and a space inside the second housing portion; and
    a main board provided in the second housing portion; and
  an attachable/detachable chamber module inserted into the space of the second housing through the opening of the second housing portion of the body module in an attachable/detachable manner, the attachable/detachable chamber module comprising:
    a first housing portion;
    an optical chamber in the first housing portion to provide a sealed space;
    an air inlet pipe for introducing air into the optical chamber, the air inlet pipe configured to be fixed attachably and detachably to the second housing portion and the first housing portion when the attachable/detachable chamber module is contained in the space of the body module;
    a particle counting unit provided in the first housing portion so as to generate light into the optical chamber, to collect light scattered by particles included in air introduced into the optical chamber, and to generate a light scattering signal; and
    a substrate provided inside the first housing portion and electrically connected to the particle counting unit, and on which the memory is mounted; and
    a memory that stores a reference voltage value for each channel, and is configured to extract the reference voltage value for each channel from the memory and to transmit the reference voltage value to the body module,
  wherein the body module is configured to receive the light scattering signal and the reference voltage value for each channel from the attachable/detachable chamber module, and is configured to count a number of particles each having a light scattering signal value greater than the reference voltage value for each channel.

2. The device of claim 1, wherein the body module is configured to acquire use-related information including one or more of use time, use temperature, and use-degree-of-cleanliness of the particles counting device, and
  the body module includes a display that displays the use-related information on a screen.

3. The device of claim 2, wherein the body module is configured to count the use time of the particles counting device and is configured to count accumulated use time of the particles counting device when the particles counting device is operated;
  the body module is configured to measure the use temperature of the particles counting device through a temperature sensor; and
  the body module is configured to measure the use-degree-of-cleanliness on the basis of the counted number of particles for each channel.

4. The device of claim 2, wherein the body module is configured to generate a maintenance alarm by comparing the acquired use-related information with preset threshold use information.

5. The device of claim 3, wherein the body module is configured to transmit the acquired use-related information to the attachable/detachable chamber module to be stored in the memory.

6. The device of claim 1, wherein the attachable/detachable chamber module further comprises:
  a first connector provided on one side of the substrate so as to protrude toward the outside of the first housing portion,
  wherein the body module further comprises:
    a second connector provided on one side of the main board such that, if the attachable/detachable chamber module is contained in the second housing portion, the second connector is connected to the first connector,
  wherein the attachable/detachable chamber module transmits the light scattering signal and the reference voltage value for each channel to the main board through the first connector and the second connector.

7. The device of claim 6, wherein the space of the second housing portion of the body module further comprises:
  a first containing space in which the attachable/detachable chamber module is contained on one side inside of the second housing portion;
  a second containing space in which the main board is contained on the other side inside of the second housing portion;
  a partition wall provided between the first containing space and the second containing space inside the second housing portion and partitioning the first containing space and the second containing space; and
  a connector coupling groove formed in the partition wall, and
  wherein the first connector is connected to the second connector through the connector coupling groove.

8. The device of claim 7, wherein the particles counting device further comprises:
  a first inlet pipe insertion hole provided in the first housing portion; and
  a second inlet pipe insertion hole provided in the second housing portion,
  wherein the air inlet pipe is inserted into the second inlet pipe insertion hole and the first inlet pipe insertion hole to communicate with the optical chamber when the attachable/detachable chamber module is contained in the first receiving space.

9. The device of claim 6, wherein
  the substrate is mounted on a lower end part of the first housing portion;
  the first connector is provided to protrude from the lower end of the first housing portion to the outside;
  the main board is mounted on a bottom surface of the second housing portion; and
  the second connector is provided at a position corresponding to the first connector on the main board.

* * * * *